(12) United States Patent
Adams et al.

(10) Patent No.: US 9,718,197 B2
(45) Date of Patent: Aug. 1, 2017

(54) COMPOSITE KNIFE

(71) Applicants: Richard Adams, Bolton, MA (US); James Sorensen, Eagan, MN (US)

(72) Inventors: Richard Adams, Bolton, MA (US); James Sorensen, Eagan, MN (US)

(73) Assignee: CPS Technologies Corp, Norton, MA (US)

( * ) Notice: Subject to any disclaimer, the term of this patent is extended or adjusted under 35 U.S.C. 154(b) by 160 days.

(21) Appl. No.: 14/545,834

(22) Filed: Jun. 26, 2015

(65) Prior Publication Data
US 2016/0375593 A1    Dec. 29, 2016

(51) Int. Cl.
| | |
|---|---|
| *B26B 9/00* | (2006.01) |
| *B32B 15/20* | (2006.01) |
| *B32B 15/14* | (2006.01) |
| *B32B 3/26* | (2006.01) |
| *B32B 5/26* | (2006.01) |
| *B32B 18/00* | (2006.01) |

(52) U.S. Cl.
CPC ............... *B26B 9/00* (2013.01); *B32B 3/266* (2013.01); *B32B 5/26* (2013.01); *B32B 15/14* (2013.01); *B32B 15/20* (2013.01); *B32B 18/00* (2013.01); *B32B 2262/105* (2013.01); *B32B 2307/72* (2013.01); *C04B 2237/36* (2013.01); *C04B 2237/363* (2013.01); *C04B 2237/38* (2013.01)

(58) Field of Classification Search
CPC .. B26B 9/00; B32B 5/26; B32B 18/00; B32B 15/14; B32B 3/266; B32B 15/20; B32B 2307/72; B32B 2262/105; C04B 2237/36; C04B 2237/363; C04B 2237/38
See application file for complete search history.

(56) References Cited

U.S. PATENT DOCUMENTS

| | | | |
|---|---|---|---|
| 1,414,997 A | * | 5/1922 | Zinn ................ A22B 3/10 30/165 |
| 3,681,846 A | | 8/1972 | Gerber |
| 3,975,891 A | | 8/1976 | Gunther |
| 4,896,424 A | | 1/1990 | Walker |
| 5,256,496 A | | 10/1993 | Kluczynski |
| 6,207,294 B1 | | 3/2001 | Rutter |

(Continued)

FOREIGN PATENT DOCUMENTS

EP    1 935 231 A1 * 9/2007

*Primary Examiner* — Hwei C Payer

(57) ABSTRACT

A composite knife made from layers of Metal Matrix Composite (MMC) is disclosed. It includes a middle layer of fibrous preform including a hard insert placed longitudinally at its periphery. The hard insert, after sharpening, represents the cutting blade portion of the composite knife. The composite knife further includes a carrier which forms the load bearing member of the cutting blade, as well as forming the integral handle of the composite knife. The carrier portion of the composite knife includes at least one top and at least one bottom layers of fibrous preform, sandwiching the middle layer that contains the cutting edge portion of the knife. A metallic material is infiltrated within the fibrous preforms and extends throughout the composite blade structure forming the MMC knife, the metallic material bonding the middle layer within the carrier, and bonding the top and bottom surface of the hard insert within the carrier.

20 Claims, 3 Drawing Sheets

(56) References Cited

U.S. PATENT DOCUMENTS

| | | | | |
|---|---|---|---|---|
| 6,260,280 | B1* | 7/2001 | Rapisardi | B26B 9/02 30/346.53 |
| 6,389,699 | B1* | 5/2002 | Ecer | B26B 9/00 30/346.54 |
| 8,499,673 | B2* | 8/2013 | Keller | A61B 17/3211 30/314 |
| 8,778,259 | B2* | 7/2014 | Beckmann | B22F 7/06 419/23 |
| 2013/0316116 | A1* | 11/2013 | Adams | B26B 9/00 428/47 |
| 2016/0375593 | A1* | 12/2016 | Adams | B26B 9/00 30/350 |
| 2017/0015595 | A1* | 1/2017 | Weaver | C04B 35/62884 |

* cited by examiner

COMPOSITE KNIFE

FIELD OF THE INVENTION

The present invention relates to a Metal Matrix Composite (MMC) cutting tool which has improved laminate strength, reduced weight, is a single unitary structure, and utilizes a cutting edge that is a small percentage of the total material volume.

BACKGROUND OF THE INVENTION

Knives, blades and cutting edge tools have traditionally been made of an essentially uniform material which is typically hardened for cutting purposes. The hardening usually occurs through known heat tempering. Historically, blacksmiths forged axes by folding softer iron around an iron mold and hammer welding a steel insert between the two iron sides so the steel formed the actual cutting edge. This gave a superior cutting edge and conserved the most expensive steel.

Other blades such as samurai blades use methods of incorporating a soft and hard alloy to gain the benefits of both. An example of a knife blade construction utilizing an outer layer of a soft material and an inner layer of a hard material is found in U.S. Pat. No. 3,681,846. In this patent an outer layer of steel or aluminum encases an inner layer of a relatively hard material such as tungsten carbide. Another patent disclosing a laminated knife blade is shown in U.S. Pat. No. 5,256,496. In this patent a titanium-high carbon steel laminate is made with an outer layer of titanium encasing an inner steel blade.

One of the major problems with laminating hard alloy metals is securing the metals together. Delamination of the metals at the interface between the dissimilar metals often results when the laminated cutting tool is put to use. This delamination results in an inferior product and could also result in a safety hazard.

There is a need for a cutting tool which successfully employs a composite structure in the form of a Metal Matrix Composite (MMC), that is light weight. There is a need for a cutting tool which does not delaminate. There is a need for a cutting tool which sharpens itself constantly via the processes of normal use and wear. There is a need for a cutting tool that can utilize a reduced volume cutting edge to save in material cost, the cutting edge being secured within the composite structure via infiltration bonding. Finally, there is a need for a composite knife having a one piece structure that integrally bonds the cutting edge within the structure, and multiple material layers to one another.

SUMMARY OF THE INVENTION

The present invention comprises a composite knife made from a Metal Matrix Composite (MMC) structure having a plurality of material layers. The Composite structure is infiltrated with a liquid metal which solidifies within the material layers of open porosity thereby binding the layers together. In the preferred embodiment, the present invention utilizes a middle layer of fibrous preform, where a portion of the middle layer comprises a hard insert placed longitudinally at the periphery of the middle layer. The hard insert, after sharpening, represents the cutting blade portion of the composite knife. The hard insert may be a hard ceramic or a material such as tungsten carbide suitable as a cutting medium.

The composite knife further includes a carrier which forms the load bearing member of the cutting blade, as well as forming the integral handle of the composite knife. The carrier portion of the composite knife includes at least one top and at least one bottom layer of fibrous preform, sandwiching the middle layer that contains the cutting edge portion of the knife. These layers are placed in a mold cavity suitable for infiltration casting. A metallic material is infiltrated within the fibrous preforms and extends throughout the composite blade structure, the metallic material bonding the middle layer within the carrier, and bonding the top and bottom surface of the hard insert within the carrier.

The metallic material infiltrates throughout the composite knife forming an encapsulating barrier with an exposed cutting blade portion. The resultant density of the composite knife is <4.7 gr/cc and the bending stiffness is 25% higher than a knife of the same geometry made from solid titanium. The metallic material solidifies within the composite materials open porosity thereby binding the layers together to create a coherent integral structure.

The inserts may include an infinite combination of dense material and porous material types and geometries. These dense materials may comprise inorganic material systems such as ceramics, metals or composites with dense microstructures. A mold chamber is fabricated to create the final shape or closely approximate that desired of the final product.

BRIEF DESCRIPTION OF THE DRAWINGS

The invention is best understood from the following detailed description when read in connection with the accompanying drawings, which illustrate various embodiments of the present invention.

DETAILED DESCRIPTION OF THE INVENTION

The following detailed description illustrates the invention by way of example and not by way of limitation. This description will clearly enable one skilled in the art to make and use the invention, and describes embodiments, adaptations, variations, alternatives and uses of the invention, including what I presently believe is the best mode of carrying out the invention.

Figure 1:
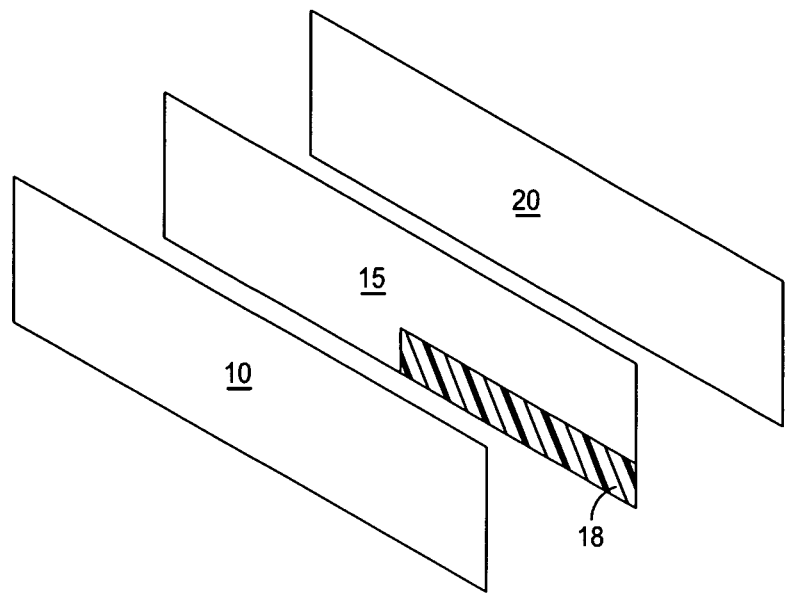
FIG. 1 is an exploded view of the layers of the composite knife of the present invention prior to the addition of the metallic bonding material and prior to the sharpening of the blade edge.
Figure 2:
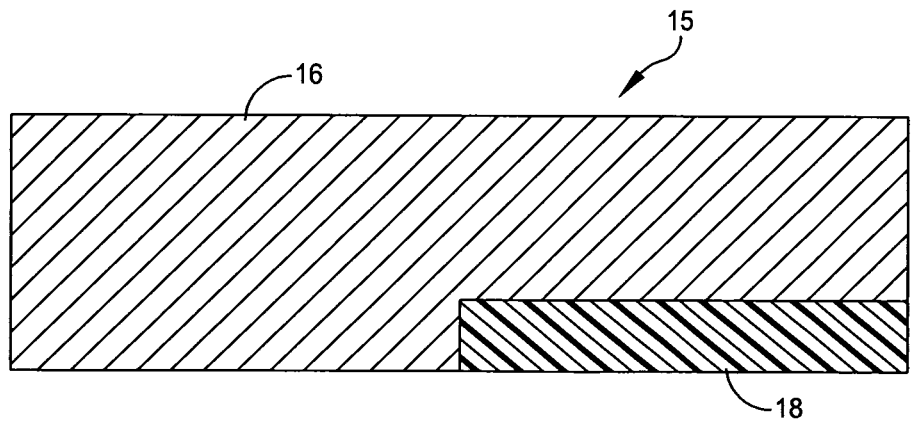
FIG. 2 illustrates the middle layer of fibrous preform containing the hard insert at the periphery of the preform.
Figure 3:
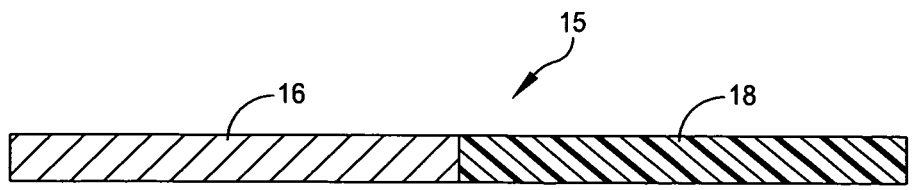
FIG. 3 illustrates a side view of FIG. 2.

FIG. 1 illustrates a general perspective view of the material layers 10, 15, 20 of a composite knife 25 (FIG. 6) according to the present invention, prior to the composite layers being infiltrated with a metallic material and prior to the resulting Metal Matrix Composite (MMC) being demolded and cut into the shape of a knife. As illustrated in FIG. 2, the middle layer 15 is a combination of a dense ceramic insert 18 and fibrous material 16. Insert 18 is formed within the fibrous material 16 by being placed longitudinally at the peripheral edge of middle layer 15. As illustrated in FIG. 3, insert 18 is substantially the same thickness of fibrous material 16 resulting in a uniform material thickness of middle layer 15. In the preferred embodiment, the insert 18 is a hard material such as tungsten carbide, however other materials suitable to form a cutting blade may include inorganic material systems such as ceramics, metals, carbon/graphite materials, or composites with dense microstructures.

Top layer(s) 10 and bottom layer(s) 20, may comprise a fibrous ceramic having a continuous ceramic fiber, such as "Nextel Ceramic Oxide fiber 610", from the 3M Company, and in the preferred embodiment have between about 20 percent and about 70 percent ceramic fiber content. Typically, the top and bottom layers 10, 20 have a thickness of at least equal to the thickness of the middle layer.

In the preferred embodiment the middle layer has a thickness of at least 1 mm. The fibrous material 16 forming part of the middle layer may comprise a fibrous ceramic having a discontinuous ceramic fiber, such as alumina, alumina-silica, SiC or Bn, and in the preferred embodiment have between about 3 percent and between about 30 percent fiber content.

Figure 4:
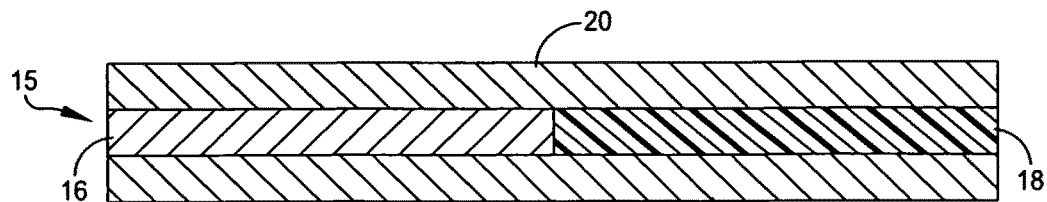
FIG. 4 illustrates a cross section of the composite knife showing the top, bottom, and middle layers.
Figure 5:
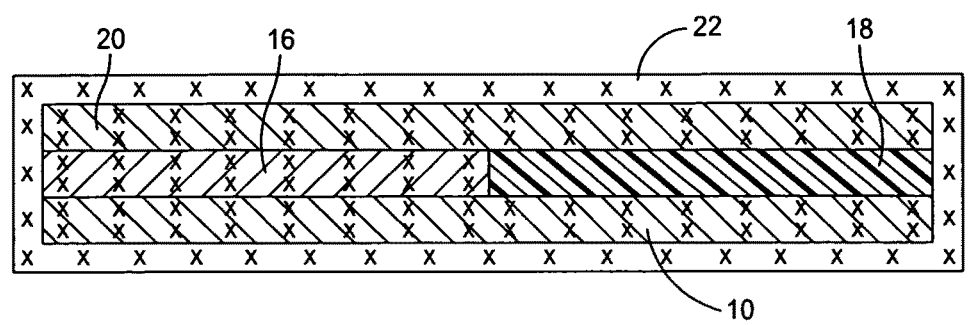
FIG. 5 illustrates the composite knife of FIG. 4, after the addition of the metallic bonding material.

As illustrated in FIG. 4, Top 10, middle 15, and bottom layers 20 are stacked prior to being inserted in a mold cavity suitable for molten metal infiltration casting. The mold cavity is next infiltrated under pressure with molten metal denoted by "x" allowing for metal to penetrate into any open porosity of the middle layer 15 fibrous material portion 16 and within the open porosity of top layer 10 and bottom layer 20. As illustrated in FIG. 5, the metal binds the layers together penetrating throughout the interior of layers 10, 15, and 20 to form the composite structure. The ceramic insert 18 shows only surface bonding to the metal infiltrant and no infiltration within the interior of the dense material. The entire composite structure in the form of a sandwich includes a metal infiltrated within any interstices in any layer. The metal infiltrant encases the composite structure binding the top, bottom, and middle layers together. As illustrated in FIG. 5, the metallic material serves to bond the insert 18 to the middle layer and between the top and bottom layers, securing it therebetween.

Figure 8:
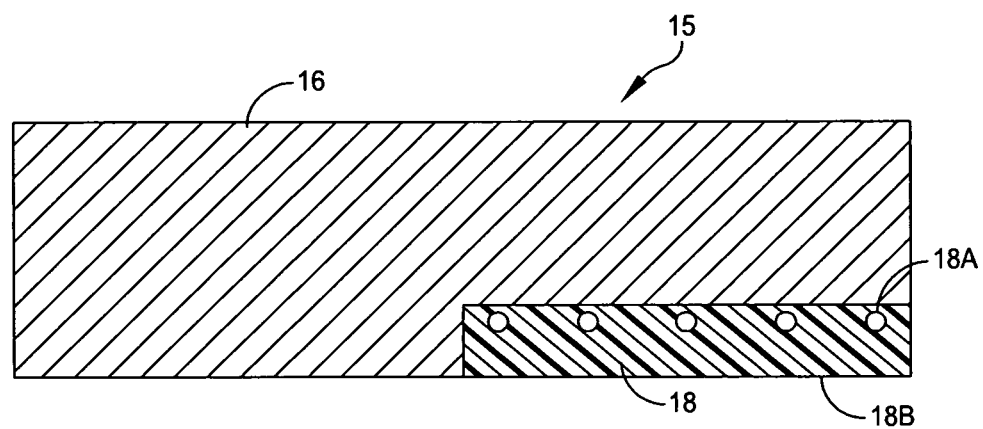
FIG. 8 illustrates an alternative embodiment of the middle layer showing holes in the hard insert for increased rigidity and bonding.

Referring to FIG. 8, an alternative embodiment of middle layer 15 is illustrated showing holes 18A place away from edge 18B. The holes allow for the metallic material to penetrate and provide a direct structural tie between top and bottom layers 10 and 20 to insert 18. The metallic material will essentially form metal posts that will penetrate the top, middle and bottom layers, and provide additional securement of insert 18. The holes are positioned away from cutting edge 18B so as not to be exposed in the cutting edge 18B.

Figure 6:
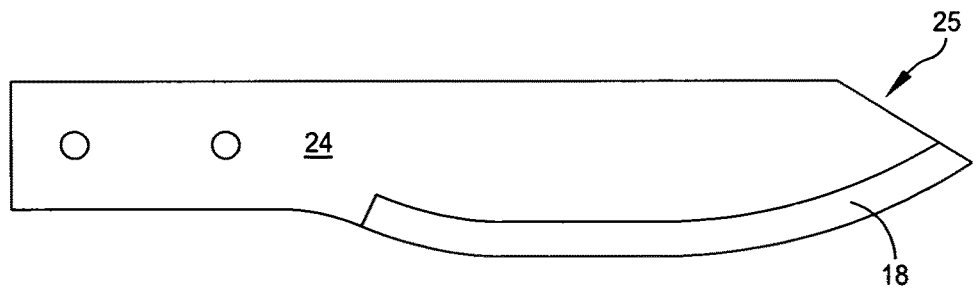
FIG. 6 illustrates the composite knife of FIG. 5, after it has been cut to the proper dimensions and the cutting edge exposed and sharpened.
Figure 7:
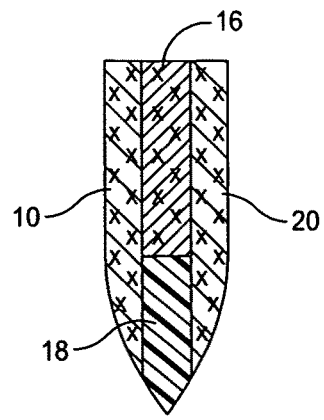
FIG. 7 illustrates a cross-section of FIG. 6 taken at the knifes edge.

The mold chamber may be fabricated to create the final shape or closely approximate that desired of the final product. The composite structure is next demolded and comprises a hybrid structure of metal matrix composite and a ceramic insert encapsulated by aluminum rich skin 22. A demolded composite structure as in FIG. 5, will require additional machining or finishing, to form the composite knife 25 illustrated in FIG. 6. Such finishing will entail a sharpening and removal of a portion of layers 22 and 10 to expose the hard ceramic edge 18, and cutting to form handle 24. As illustrated in FIG. 6, a knife formed from the composite structure comprises an integral handle 24 portion that forms a carrier structure for the blade edge 18 (FIG. 7). Handle 24 is continuous with top 10 and bottom 20 layers of fibrous preform which effectively "sandwiches" insert 18 therebetween.

Utilizing a MMC structure having only a small percentage of material as the cutting blade saves on both weight and cost. The density of a composite knife made in accordance with the present invention is less than 4.7 gr/cc and has a bending stiffness at least 25% greater than a knife of the same geometry made from solid titanium.

The MMC outer layers provide the necessary strength, mass and elasticity and the hard ceramic insert provides the hardness that is necessary for a sharp cutting edge. A Ceramic edge would wear more slowly than the MMC so that it protrudes slightly, forming an effective sharp edge.

As various changes could be made in the above constructions without departing from the scope of the invention, it is intended that all matter contained in the above description or shown in the accompanying drawings shall be interpreted as illustrative and not in a limiting sense. Rather, the scope of the invention is to be determined only by the appended claims and their equivalents.

We claim:

1. A composite knife, comprising:
   a middle layer of fibrous preform, a portion of said middle layer comprising a ceramic insert placed longitudinally at the periphery of said middle layer and being substantially coplanar with said fibrous preform, said ceramic insert including a top surface and a bottom surface, and an exposed cutting blade portion;
   a carrier structure to support said exposed cutting blade portion, said carrier structure comprising at least one top layer and at least one bottom layer of fibrous preform, said middle layer disposed between said at least one top layer and said at least one bottom layer and in contact thereto;
   a metallic material, said metallic material infiltrated within said middle layer said metallic material bonding said middle layer within said carrier structure, said metallic material bonding said top and bottom surfaces of said ceramic insert to said carrier structure, said metallic material extending outward to encapsulate said composite knife; and
   wherein said composite knife has a density of <4.7 gr/cc.

2. A composite knife as in claim 1 wherein said middle layer of fibrous preform comprises discontinuous ceramic fibers having between 3 and 30 percent fiber content.

3. A composite knife as in claim 1 wherein said top and bottom layers of the fibrous preform each comprises continuous ceramic fibers having between 20 percent and 70 percent fiber content.

4. A composite knife as in claim 1 wherein said top, bottom, and middle layers are symmetrical.

5. A composite knife as in claim 1, wherein said ceramic insert includes a plurality of holes placed away from said exposed cutting blade portion, and wherein said metallic material bonds within said holes and outward to said fibrous preforms of said carrier structure.

6. A composite knife as in claim 1 wherein said at least one top layer and said at least one bottom layer each has a thickness of at least equal to the thickness of said middle layer.

7. A composite knife as in claim 1 wherein said middle layer has a thickness of at least 1 mm.

8. A composite knife as in claim 1, wherein said metallic material is selected from the group consisting of aluminum alloys, and magnesium.

9. A composite knife as in claim 1, wherein the ceramic insert is tungsten carbide.

10. A composite knife as in claim 1, wherein the ceramic insert is selected from the group consisting of ceramics, metals, carbon/graphite materials, or composites with dense microstructures.

11. A composite knife as in claim 3, wherein said continuous ceramic fibers are Nextel Ceramic Oxide fiber 610.

12. A composite knife as in claim 2, wherein said discontinuous ceramic fibers are selected from the group consisting of alumina, alumina-silica, SiC or Bn.

13. A composite knife, comprising:
a middle layer of fibrous preform, a portion of said middle layer comprising a ceramic insert placed longitudinally at the periphery of said middle layer and being substantially coplanar with said fibrous preform, said ceramic insert including a top surface and a bottom surface, and an exposed cutting blade portion;
a carrier structure to support said exposed cutting blade portion, said carrier structure comprising at least one top layer and at least one bottom layer of fibrous preform, said middle layer disposed between said at least one top layer and said at least one bottom layer and in contact thereto;
a metallic material, said metallic material infiltrated within said middle layer said metallic material bonding said middle layer within said carrier structure, said metallic material bonding said top and bottom surfaces of said ceramic insert to said carrier structure, said metallic material extending outward to encapsulate said composite knife and
wherein said composite knife has a density of <4.7 gr/cc; and
wherein said middle layer of fibrous preform comprises discontinuous ceramic fibers having between 3 and 30 percent fiber content; and
wherein said top and bottom layers of said fibrous preform each comprises continuous ceramic fibers having between 20 percent and 70 percent fiber content.

14. A composite knife, comprising:
a middle layer of fibrous preform, a portion of said middle layer comprising a ceramic insert placed longitudinally at the periphery of said middle layer and being substantially coplanar with said fibrous preform, said ceramic insert including a top surface and a bottom surface, and an exposed cutting blade portion;
a carrier structure to support said exposed cutting blade portion, said carrier structure comprising at least one top layer and at least one bottom layer of fibrous preform, said middle layer disposed between said at least one top layer and said at least one bottom layer and in contact thereto;
a metallic material, said metallic material infiltrated within said middle layer said metallic material bonding said middle layer within said carrier structure, said metallic material bonding said top and bottom surfaces of said ceramic insert to said carrier structure, said metallic material extending outward to encapsulate said composite knife.

15. A composite knife as in claim 14, wherein said composite knife has a density of <4.7 gr/cc.

16. A composite knife as in claim 14, wherein said middle layer of fibrous preform comprises discontinuous ceramic fibers having between 3 and 30 percent fiber content.

17. A composite knife as in claim 14, wherein said top and bottom layers of said fibrous preform each comprises continuous ceramic fibers having between 20 percent and 70 percent fiber content.

18. A composite knife as in claim 14, wherein said ceramic insert includes a plurality of holes placed away from said exposed cutting blade portion, and wherein said metallic material bonds within said holes and outward to said fibrous preforms of said carrier structure.

19. A composite knife as in claim 14 wherein said at least one top layer and said at least one bottom layer each has a thickness of at least equal to the thickness of said middle layer.

20. A composite knife as in claim 14 wherein said middle layer has a thickness of at least 1 mm.

* * * * *